United States Patent
Cudak et al.

(10) Patent No.: US 11,212,293 B1
(45) Date of Patent: Dec. 28, 2021

(54) CONDITIONALLY PROVIDING NETWORK ACCESS TO ALLOW A NETWORK SESSION TO REACH COMPLETION

(71) Applicant: Lenovo Enterprise Solutions (Singapore) Pte. Ltd., Singapore (SG)

(72) Inventors: Gary D. Cudak, Oxford, NC (US); John M. Petersen, Wake Forest, NC (US); Alexander V. Verrigni, Cary, NC (US); Ronald F. Ridgeway, Holly Springs, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/915,880

(22) Filed: Jun. 29, 2020

(51) Int. Cl.
*H04L 29/06* (2006.01)

(52) U.S. Cl.
CPC ........ *H04L 63/108* (2013.01); *H04L 63/0263* (2013.01); *H04L 67/40* (2013.01); *H04L 69/22* (2013.01)

(58) Field of Classification Search
CPC ... H04L 63/0263; H04L 63/108; H04L 67/40; H04L 69/22
See application file for complete search history.

(56) References Cited

U.S. PATENT DOCUMENTS

| | | | | |
|---|---|---|---|---|
| 8,972,495 B1 * | 3/2015 | Borna | ...................... | H04L 67/42 709/204 |
| 10,958,702 B1 * | 3/2021 | Yang | .................. | H04N 21/2387 |
| 2004/0122947 A1 * | 6/2004 | Banerjee | ................. | G06F 16/95 709/225 |
| 2010/0088620 A1 * | 4/2010 | Tran | .................. | H04N 21/44222 715/764 |
| 2011/0126246 A1 * | 5/2011 | Thomas | ............. | H04N 21/2187 725/93 |
| 2015/0271247 A1 * | 9/2015 | Patsiokas | ................ | H04L 69/14 709/217 |
| 2016/0330578 A1 * | 11/2016 | Moussavian | ........ | H04L 47/2425 |
| 2017/0065894 A1 * | 3/2017 | Woog | ..................... | A63F 13/49 |

(Continued)

OTHER PUBLICATIONS

Nowers, Madison. "How to Set Parental Controls for Windows 10". https://www.netnanny.com/blog/how-to-set-parentalcontrols-for-windows-10/. pp. 1-16. (Year: 2019).*

*Primary Examiner* — John M MacIlwinen
(74) *Attorney, Agent, or Firm* — Jeffrey L. Streets (57) ABSTRACT

A computer program product and a networking device, such as a router or firewall, including a processor for executing the computer program product to cause the processor to perform various operations. The operations may include providing network access to a computing device, establishing a default rule to change the network access at a first time-of-day, and establishing a conditional rule that the network access will remain unchanged in response an ongoing network session at the first time-of-day that will reach completion before the second time-of-day. The operations may further include obtaining session progress data for the ongoing session, continue providing the network access until completing the session in response to determining that the ongoing session can reach completion before the second time-of-day, and changing the network access before the session reaches completion in response to determining that the ongoing session will not reach completion before the second time-of-day.

20 Claims, 5 Drawing Sheets

(56) References Cited

U.S. PATENT DOCUMENTS

2019/0149414 A1\* 5/2019 Varghese ............ H04L 41/0806
　　　　　　　　　　　　　　　　　　　　　　　709/220
2019/0347180 A1\* 11/2019 Cranfill ................. G06F 21/629

\* cited by examiner

CONDITIONALLY PROVIDING NETWORK ACCESS TO ALLOW A NETWORK SESSION TO REACH COMPLETION

BACKGROUND

The present disclosure relates to systems, methods and computer program products for configuring and managing network access provided to a computing device.

BACKGROUND OF THE RELATED ART

A network router is a computer network device that forwards data packets between two different computer networks. A common example of a network router is a home network router that directs traffic between a local area network that connects computing device within the home to a wide area network, such as the Internet. The two networks typically have different Internet Protocol (IP) addresses and the network router maintains a routing table with information enabling the network router to direct data packets from one network to another network as the data packet is being forwarded toward its destination.

A computer network device, such as a network router, may allow a system administrator to configure the computer network device in a manner that changes or turns off network access to a computing device at a predetermined time of day. For example, a home network router may provide parental controls that allow a parent to prevent a computing device in the home local area network from accessing a wide area network or certain services in the wide area network at a predetermined time of day. For example, a parent may configure network settings so that their home network router will turn off Internet access to computing devices used by their children at a configurable time of day.

BRIEF SUMMARY

Some embodiments provide a computer program product comprising a non-volatile computer readable medium and non-transitory program instructions embodied therein, the program instructions being configured to be executable by a processor to cause the processor to perform various operations. The processor may be a processor controlling various operations of a network router or firewall. The operations may comprise providing network access to a computing device, establishing a default rule to change the network access to the computing device in response to a first time of day, and establishing a conditional rule that the network access to the computing device will remain unchanged after the first time of day until an ongoing network session reaches completion in response to a condition that the ongoing network session has reached at least a predetermined percentage of completion at the first time of day. The operations may further comprise obtaining network session progress data for the ongoing network session of the computing device, continue providing the network access to the computing device until the network session has reached completion in response to determining that the ongoing network session has reached at least a predetermined percentage of completion at the first time of day, and changing the network access to the computing device before the network session reaches completion in response to determining that the ongoing network session has not reached at least the predetermined percentage of completion at the first time of day.

Some embodiments provide a network device comprising at least one non-volatile storage device storing program instructions and at least one processor configured to process the program instructions, wherein the program instructions are configured to, when processed by the at least one processor, cause the network device to perform various operations. In some embodiments of the router, the operations may comprise providing network access to a computing device, establishing a default rule to change the network access to the computing device in response to a first time of day, and establishing a conditional rule that the network access to the computing device will remain unchanged after the first time of day in response to a condition that a network session that is ongoing via the network access at the first time of day will reach completion before the second time of day. The operations may further comprise obtaining network session progress data for the ongoing network session of the computing device, continue providing the network access to the computing device until the network session has reached completion in response to determining that the ongoing network session can reach completion before expiration of the second time of day, and changing the network access to the computing device before the network session reaches completion in response to determining that the ongoing network session will not reach completion before expiration of the second time of day.

DETAILED DESCRIPTION

Some embodiments provide a computer program product comprising a non-volatile computer readable medium and non-transitory program instructions embodied therein, the program instructions being configured to be executable by a processor to cause the processor to perform various operations. The operations may comprise providing network access to a computing device, establishing a default rule to change the network access to the computing device in response to a first time of day, and establishing a conditional rule that the network access to the computing device will remain unchanged after the first time of day in response to a condition that a network session that is ongoing via the network access at the first time of day will reach completion before a second time of day. The operations may further comprise obtaining network session progress data for the ongoing network session of the computing device, continue providing the network access to the computing device until the network session has reached completion in response to determining that the ongoing network session can reach completion before expiration of the second time of day, and changing the network access to the computing device before the network session reaches completion in response to determining that the ongoing network session will not reach completion before expiration of the second time of day.

In some embodiments, the processor may be a component of a network router or firewall. A network router directs traffic between two networks, such as a local area network and a wide area network, such as the Internet. A firewall is a network security device that monitors and controls traffic between two networks. In these roles, both a network router and a firewall are in a position to enable, disable or otherwise control network access from one network to another. For example, the network router or firewall may control how and/or when a computing device in a local area network may access a wide area network, such as the Internet.

Some embodiments may provide network access to a computing device by enabling or allowing a connection between the computing device in a local area network and one or more computing device in a wide area network. For example, the computing device may be allowed to connect with an Internet Service Provider (ISP) that itself provides further network access to various resources, such as websites providing various content and/or services. Enabling a connection may involve monitoring network traffic and forwarding network packets having a given source identifier and/or destination identifier.

The computing device that receives the network access may be any type of computing device, including a desktop computer, notebook computer, tablet computer, smartphone, television, and/or a video game console. When the computing device uses the network access to communicate with a website or computing device in another network, a session identifier may be used to identify a network session, which includes a series of related message exchanges. For example, a network session may include a file download, an online video game, and/or a video stream. Each network packet involved in the network session may include a given session identifier that is used only until the network session comes to an end.

Some embodiments may establish the default and conditional rules by configuring network settings used by the processor. For example, an administrative user may access the network settings and enable the use of default and/or conditional rules and then enter values for the first time of day, the second time of day and/or the conditions upon which the network access may be provided after the first time of day. Some embodiments may receive and store network settings that are separately entered for each of a plurality of individual users. In one option, a network settings interface may be generated in the form of a webpage displayable on a web browser application, wherein the network settings, such as the value of the first time of day and the value of the second time of day, for each of a plurality of users are received through input from an administrative user interacting with the network setting interface. The first and/or second time of day may be input in any suitable format, such as HH:MM (a two digit hour value and a two digit minute value), either in military time (0-24 hours) or standard time (two 12 hour periods designated by ante meridiem ("am") or post meridiem ("pm")). Optionally, an individual user of a computing device may be identified by user credentials that are used to log in to the computing device. Accordingly, a value of the first time of day and a value of the second time of day may be associated with the identified individual user, such that the default rule and the conditional rule may be applied to the computing device using the value of the first time of day and the value of the second time of day that are associated with the individual user.

The administrative user may use the web browser to access the router's network settings by first entering the network router's Internet Protocol (IP) address into the address bar of a web browser. The web browser should then display the browser interface for the router, such that the administrative user may log in with an administrative username and password. A menu system may allow the administrative user to navigate to the network access controls according to various embodiments.

In some embodiments, a change to the network access may include a change to any one or more parameter of the network access. In one example, the operation of changing the network access to the computing device may include gradually degrading a network data transmission rate or bandwidth and/or completely terminating the network access. In other examples, the operation of changing the network access to the computing device may include restricting the network access to a particular one or more websites or network resources. In some embodiments, the operations may further include issuing a message to a user interface of the computing device describing the change that is being made to the network access. For example, the message may be output through a user interface such as a display, speaker, and/or haptic device.

In some embodiments, the operations may further include changing the network access to the computing device in response to determining that the network session has been completed after the first time of day but before the second time of day. In other words, the network access to the computing device may be changed as soon as the network session has been completed even if the second time day has not yet been reached. In some embodiments, the operations may further comprise denying network access for a new network session that a user is attempting to initiate with the computing device between the first time of day and the second time of day.

Some embodiments may include a determination about the status of the network session. A computing device may be determined to have an ongoing network session via the network access by monitoring traffic to/from the computing device. One option includes inspecting network packets to determine whether the computing device is identified as the destination or source of the packets, and perhaps also to determine whether the packets are identified with a particular network session. Some embodiments may determine whether or not the network session has reached completion. For example, if a network session was previously identified by a network session identifier through inspection of packets to/from the computing device, then no further use of the network session identifier over a predetermined period of time might indicate that the network session had ended. Alternatives for determining that a network session has reached completion may include the use of cookies, tokens, or other session management technique. A further alternative for determining that a network session has reached completion may include receiving a session completion notice from the user, the computing device, or other system resource, such as a website or content server. In some embodiments, the network router may wait to receive a completion notice, or otherwise confirm completion of the network session, before initiating the change to the network access.

Some embodiments determine, at the first time of day, whether or not a network session will reach completion before the second time of day. Such a determination may require obtaining network session progress data for the ongoing network session, as well as a progress rate and how much time remains until the second time of day. In one example, the network session includes a streaming video and the progress data indicates that there are 10 minutes of normal speed video playback remaining. If the progress is already stated in units of time, then the network session can be completed so long as the remaining time is less that the amount of time until the second time of day. In another example, the network session may include a file download and the progress data may indicate an amount of data remaining (i.e., megabytes) or a percentage complete or remaining in the file download. If the progress data is an amount of data remaining, the amount of data remaining may be divided by an available data download rate (i.e., megabytes/second) to determine how long it will take to complete the download. If the progress data identifies a percentage complete or remaining (where the percentage complete+percentage remaining=100%), it may be necessary to identify the entire size of the file, video or other content being accessed. The size of the file, video or other content may be set out in units of time (i.e., hours, minutes and/or seconds) or units of data (i.e., megabytes, etc.). After determining a remaining amount of time or data in a network session, the foregoing methods can be used to determine whether the network session will reach completion by the second time of day. It should be recognized that such determination of whether a network session will reach completion by the second time of day may be an estimate based on currently available information and it not a guarantee of completion, since network data transmission rates may slow further progress and/or a user may pause a video program, etc.

Some embodiments may further determine whether the ongoing network session is within a scope of network sessions approved for being provided network access during a time period between the first time of day and the second time of day. For example, a network session might involve communications to/from a website that is approved/disapproved for network access after the first time of day. Approved websites may be stated in the network settings as an exception of the default rule and/or disapproved websites may be stated in the network settings as an exception to the conditional rule. Furthermore, the operation to continue providing the network access to the computing device until the network session has reached completion may be performed in response to both determining that the ongoing network session can reach completion before expiration of the second time of day and determining that the ongoing network session is within the scope of network sessions approved for being provided network access during the time period between the first time of day and the second time of day.

The session progress data may be obtained in various ways from various sources. In some embodiments, the session progress data for the ongoing network session of the computing device may be obtained from data being received as part of the ongoing network session. For example, the session progress data for the ongoing network session of the computing device may be obtained from a packet header received as part of the ongoing network session. Furthermore, the session progress data obtained from the packet header may identify an amount of data remaining in a file download and/or an amount of time remaining in the ongoing network session. In some embodiments, the session progress data for the ongoing network session of the computing device may be obtained using an application programming interface (API) with a network device. In one example, the API may run on the network router, firewall or other switching device, such that the API may be accessed by a service provider and/or a user computing device. In some embodiments, the session progress data for the ongoing network session of the computing device may be obtained as user input received through a user interface, such as a touch or text input to graphical user interface or voice input to a virtual assistant. Optionally, the operations may further comprise prompting a user to input the session progress data in response to approaching and/or reaching the first time of day.

Some embodiments provide a computer program product comprising a non-volatile computer readable medium and non-transitory program instructions embodied therein, the program instructions being configured to be executable by a processor to cause the processor to perform various operations. The processor may be a processor controlling various operations of a network router or firewall. The operations may comprise providing network access to a computing device, establishing a default rule to change the network access to the computing device in response to a first time of day, and establishing a conditional rule that the network access to the computing device will remain unchanged after the first time of day until an ongoing network session reaches completion in response to a condition that the ongoing network session has reached at least a predetermined percentage of completion at the first time of day. The operations may further comprise obtaining network session progress data for the ongoing network session of the computing device, continue providing the network access to the computing device until the network session has reached completion in response to determining that the ongoing network session has reached at least a predetermined percentage of completion at the first time of day, and changing the network access to the computing device before the network session reaches completion in response to determining that the ongoing network session has not reached at least the predetermined percentage of completion at the first time of day. Embodiments of the computer program product may include program instructions for implementing or initiating any one or more of the embodiments or operations described herein.

Some embodiments provide a network device, such as a network router, comprising at least one non-volatile storage device storing program instructions and at least one processor configured to process the program instructions, wherein the program instructions are configured to, when processed by the at least one processor, cause the network device to perform various operations. In some embodiments of the router, the operations may comprise providing network access to a computing device, establishing a default rule to change the network access to the computing device in response to a first time of day, and establishing a conditional rule that the network access to the computing device will remain unchanged after the first time of day in response to a condition that a network session that is ongoing via the network access at the first time of day will reach completion before the second time of day. The operations may further comprise obtaining network session progress data for the ongoing network session of the computing device, continue providing the network access to the computing device until the network session has reached completion in response to determining that the ongoing network session can reach completion before expiration of the second time of day, and changing the network access to the computing device before the network session reaches completion in response to determining that the ongoing network session will not reach completion before expiration of the second time of day. Embodiments of the network router, firewall or other network device may include program instructions for implementing or initiating any one or more of the embodiments or operations described herein.

Some embodiments described herein address the technical problem that network settings that automatically limit network access to a particular schedule for a given user or computing device may cause a network session to be cut off before a task or activity can be completed. For example, a large download may be 95% complete, a match in a video game may only have two minutes left, or a movie stream may only have ten minutes left when network access it cut off. Accordingly, embodiments provide the technical solution of implementing a default rule for limiting network access and a conditional rule that may permit extensions of the network access to allow completion of a network session that is ongoing and estimated to reach completion soon. Since these embodiments provide a practical benefit to the user and make more efficient use of computing resources.

Figure 1:
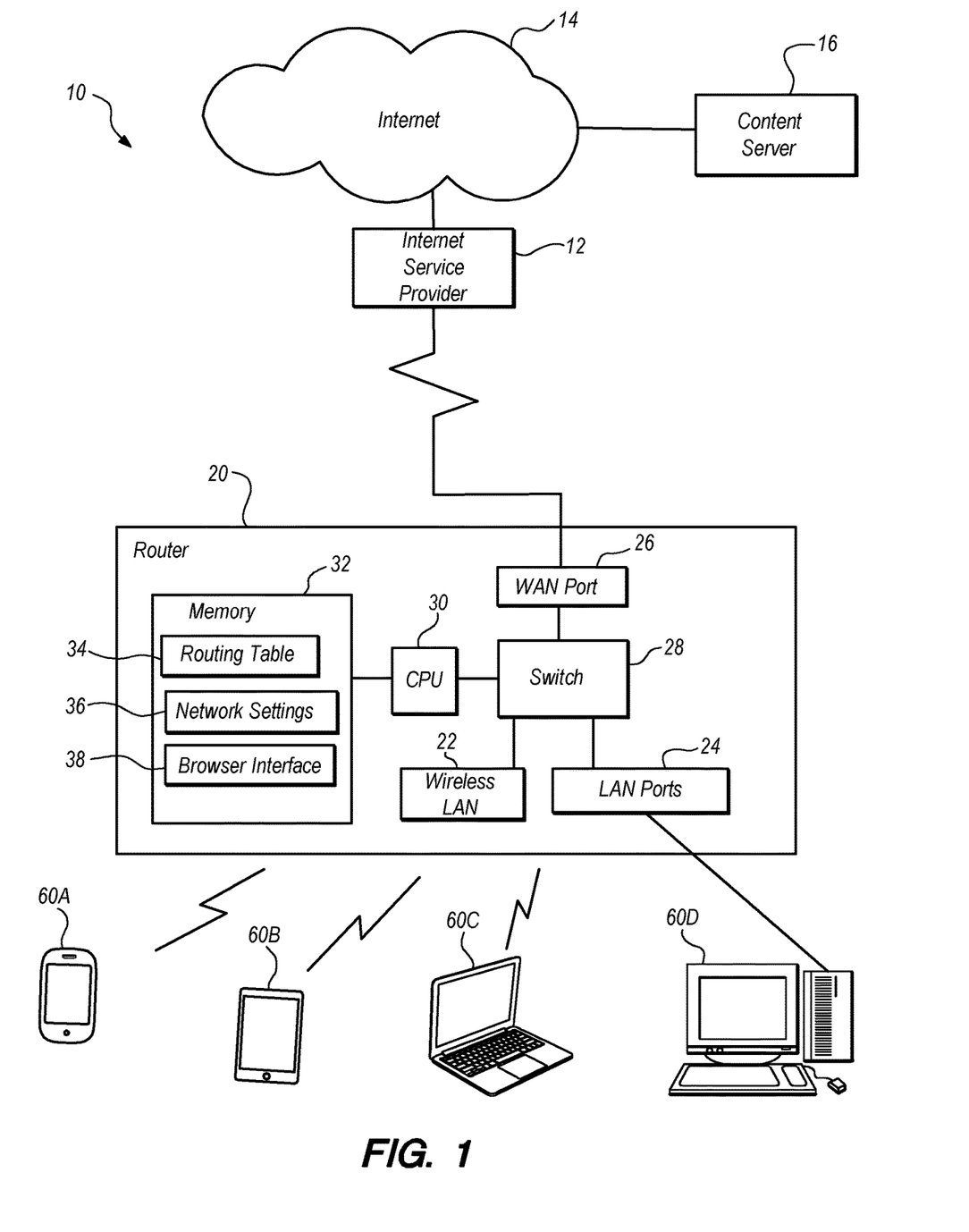
FIG. 1 is a diagram of a system that includes a network router providing network access to a computing device.

FIG. 1 is a diagram of a system 10 that includes a network router 20 providing network access to a computing device, such as one or more of a smartphone 60A, a tablet computer 60B, a notebook computer 60C, and a desktop computer 60D. In this example, the network router 20 can selectively provide access between computing devices 60A, 60B, 60C, 60D in a local area network (LAN) and devices in a wide area network (WAN), such as the Internet. In the illustrated example, the network router 20 is in communication with an Internet Service Provider (ISP) 12 that is connected to the Internet 14, including a content server 16. Accordingly, the router 20 is in a position to control whether or not any one of more of the computing devices 60A, 60B, 60C, 60D can access the content server 16 or other websites or resources on the Internet 14.

The network router 20 performs a controlled access function by selectively connecting to both the computing devices in the LAN and devices in the WAN. For example, the network router 20 may include a wireless LAN antenna 22, such as a WiFi antenna, for establishing a wireless network connection with various computing devices, such as the smartphone 60A, the tablet computer 60B, and the notebook computer 60C. The network router 20 may also include one or more LAN ports 24 for establishing a wired connection, such as an Ethernet connection, with various computing devices, such as the desktop computer 60D. The network router 20 further includes a WAN port 26 for connecting with the ISP 12 that provides access to the Internet or other wide area network.

The network router 20 further includes a switch 28 that may be controlled to direct network communications among the wireless LAN 22, the LAN ports 24 and the WAN port 26. More specifically, the switch 28 may forward network communications, typically in the form of packets, on a path from a source device toward a destination device, whether or not those devices are directly connected to the network router 20. Furthermore, the switch 28 may forward network communications between computing devices on the LAN and/or forward network communication between a computing device in the LAN and a device in the WAN, such as the Internet 14.

Still further, the network router 20 includes a processor ("CPU") 30 that is connected to a memory device 32 storing a routing table 34, network settings 36 and a browser interface 38. The processor 30 uses the routing table 34 to determine the port to which a network communication should be forwarded to reach the destination device identified in the network communication. The processor 30 uses the network settings 36 to determine how to control network access according to various embodiments described herein. For example, the network settings may include an indication whether time of day limits have been enabled, whether conditional extension have been enabled, and various parameters for each user or computing device that are necessary to implement the time of day limits or conditional extensions. These other parameters may include, for example, a first time of day, a second time of day, a condition, and a network access change. Such parameters are discussed further in reference to FIG. 3. The processor 30 may also use the browser interface 38 so that an administrative user may access and/or enter network settings via a web browser running on one of the computing devices.

Figure 2:
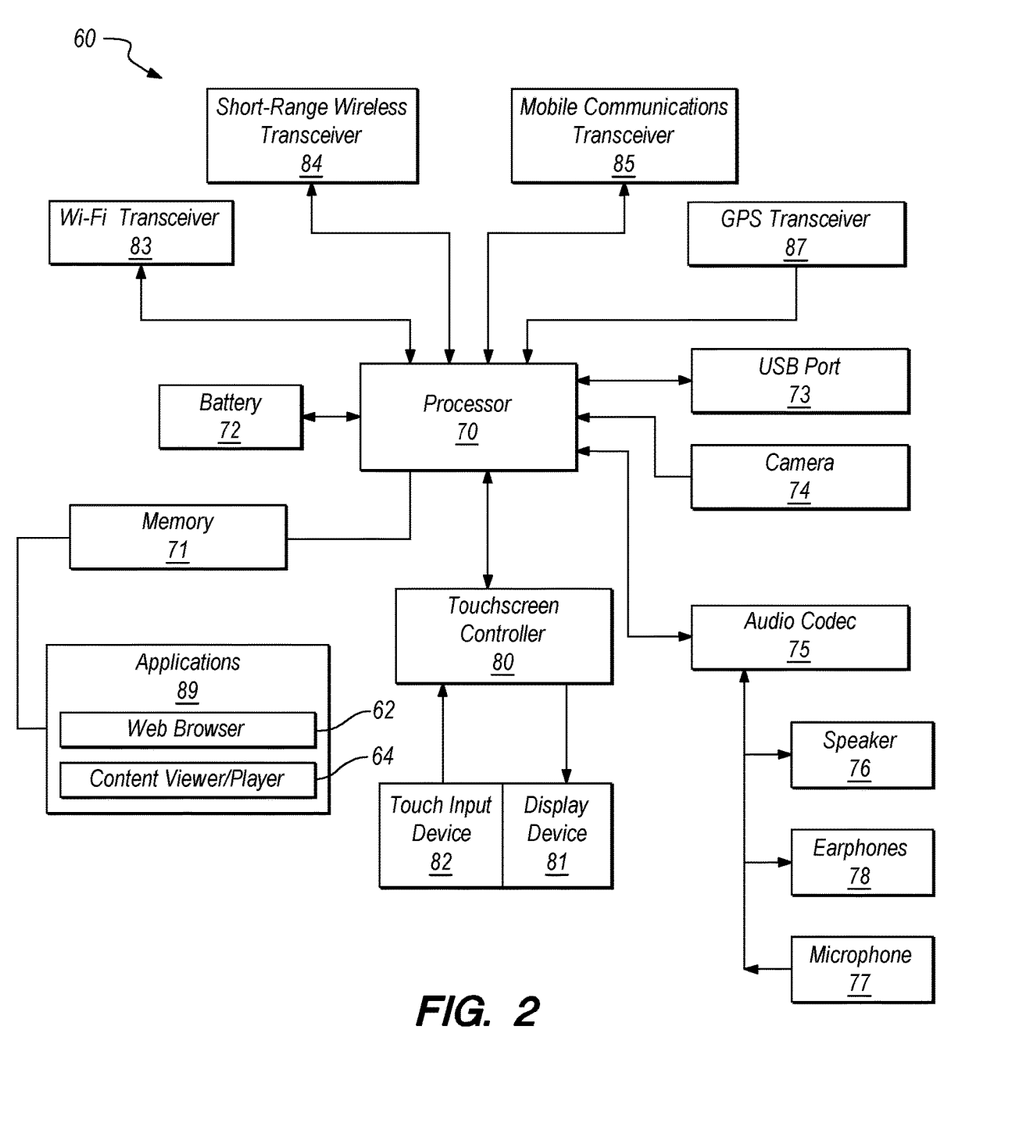
FIG. 2 is a diagram of a computing device, such as a smartphone, tablet computer, notebook computer or desktop computer.

FIG. 2 is a diagram of a computing device 60, such as the smartphone 60A, the tablet computer 60B, the notebook computer 60C, and/or the desktop computer 60D. The computing device 60 may include a processor 70, memory 71, a battery (or other power source) 72, a universal serial bus (USB) port 73, a camera 74, and an audio codec 75 coupled to a built-in speaker 76, a microphone 77, and an earphone jack 78. The computing device 60 may further include a touchscreen controller 80 which provides a graphical output to the display device 81 and an input from a touch input device 82. Collectively, the display device 81 and touch input device 82 may be referred to as a touchscreen.

The computing device 60 may also include a short-range wireless transceiver 84, a wireless local area network transceiver ("Wi-Fi transceiver") 83, a mobile communication transceiver 85 for communication with a cellular communication network, and a global positioning system (GPS) transceiver 87. In some embodiments, the wireless local area network transceiver ("Wi-Fi transceiver") 83 enables the formation of a short-range wireless connection between the computing device 60 and the network router 20 of FIG. 1.

The memory 71 may store one or more applications 89 including program instructions that are executable by the processor 70. Such applications may include a web browser 62 that may be used by a network administrative to enter network settings to the network router 20 of FIG. 1 and any other content viewer or player 64 that obtains data from the wide area network, such as the content server 16 of FIG. 1. The type of content may vary widely without limitation, such as a streaming video, online game, messaging service, and the like.

Figure 3:
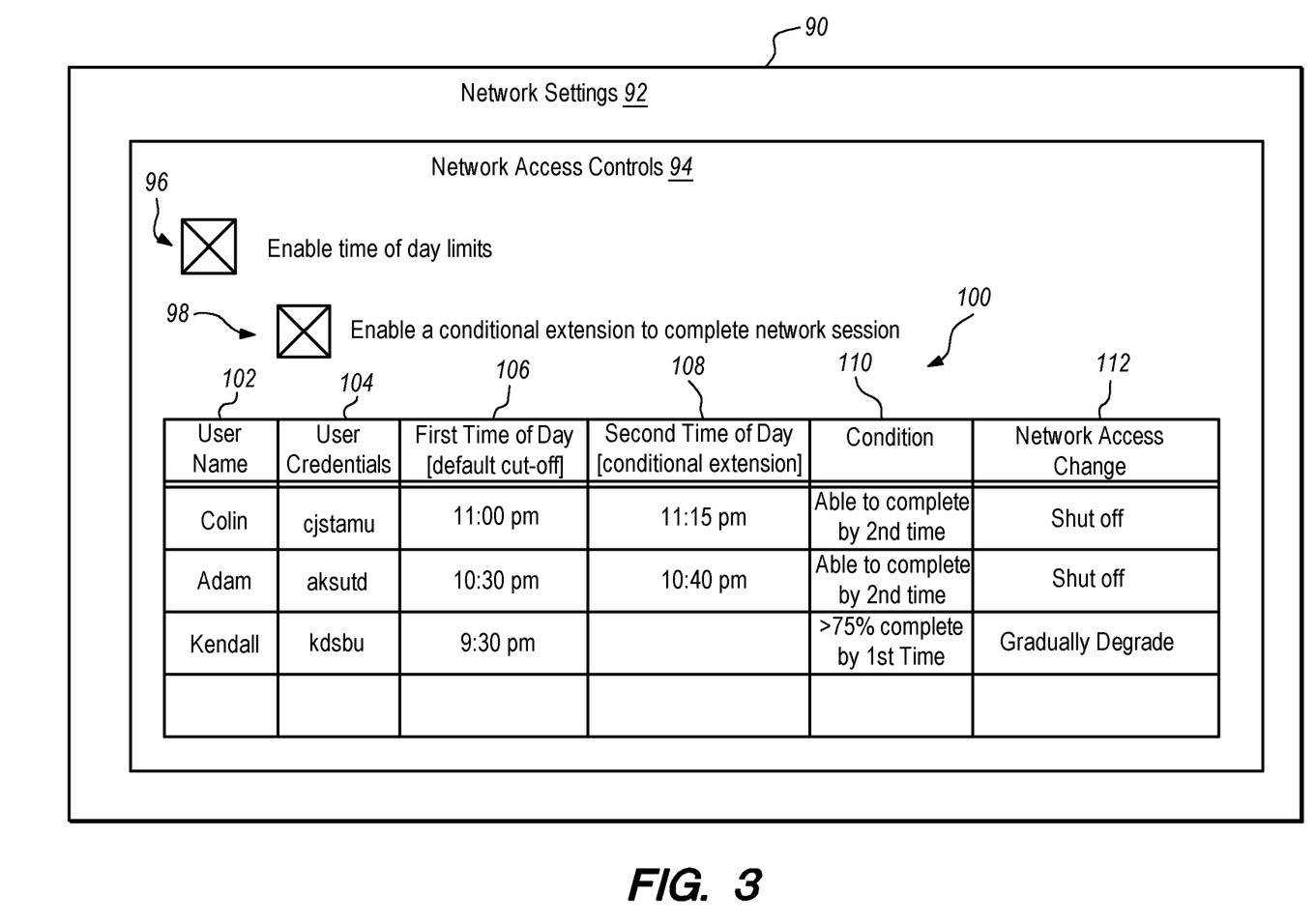
FIG. 3 is a diagram of a web browser screen displaying network settings.

FIG. 3 is a diagram of a web browser screen 90 that displays network settings 92 on a computing device for use by an administrative user. While the network settings may address any number of aspects of network operations, the network settings 92 are shown to include network access controls 94 to implement one or more of the embodiments disclosed. In this non-limiting example, a first checkbox 96 may be used to enable "time of day" limits on network access. Enabling "time of day" limits activates program instructions or logic that implement a default rule to change network access at a specific (first) time of day. With "time of day" limits enabled, the administrative user may then specify the time of day when the network access change should occur and which users or computing devices should be affected by the network access change. This example further includes a second checkbox 98 that may be used to enable a conditional extension to the network access so that a user or computing device may complete an ongoing network session. With "conditional extension" enabled, the administrative user may then, depending upon the embodiment, specify a condition such as being able to reach completion of the network session by the second time of day or a condition of a particular percentage completion of the ongoing network session at the first time of day. In addition, the administrative user may specify the nature of the network access change that should occur at either the first time of day or after the network session has reached completion after the first time of day.

FIG. 3 shows network settings 92 in which "time of day" limits enabled (checkbox 96 is checked), conditional extensions are enabled (checkbox 98 is checked), and there are various parameters set out for three individual users in the table 100. Specifically, the table 100 includes a first column 102 identifying an individual user name, a second column 104 identify the individual user's credentials for logging into a computing device, a third column 106 specifying a first time of day, a fourth column 108 specifying a second time of day, a fifth column 110 specifying a condition, and a sixth column 112 specifying a network access change.

In this example, Colin may be identified as the user of a particular computing device by the user credentials "cjstamu" used to log into the computing device. The network settings indicate that Colin's network access should be changed at 11:00 pm (see column 106) unless Colin has an ongoing network session that can reach completion by a second time of day (see column 110), wherein the second time of day is 11:15 pm (see column 108). After reaching completion of the network session, the network access should be shut off (see column 112). Adam's name and user credentials are unique, but Adam's network settings are similar except that the first and second time of day settings are somewhat earlier. Kendall has a default cut-off of network access at 9:30 pm, but if an ongoing network session has reached greater than 75% completion by 9:30 pm, then the network session is allowed be completed without a specific completion time. However, after completing the network session, network access provided to the computing device in use by Kendall will be gradually degraded.

Figure 4:
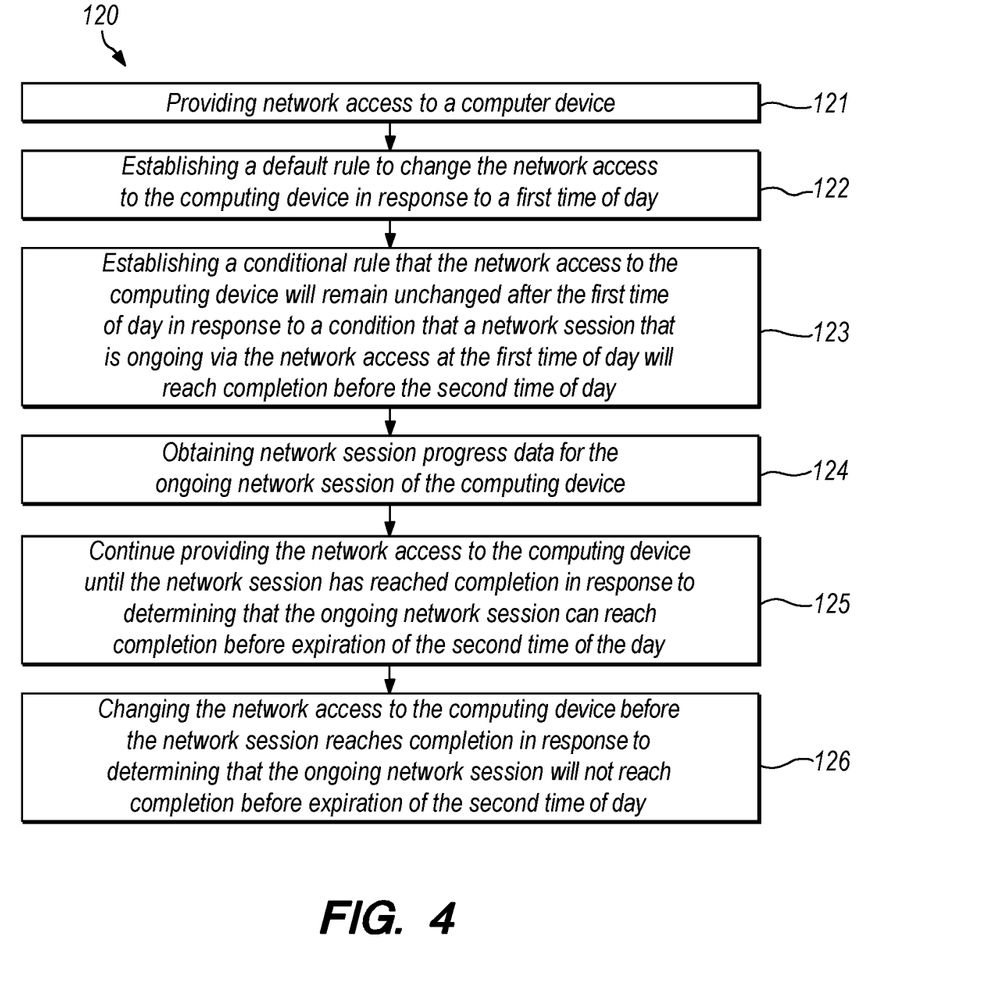
FIG. 4 is a flowchart of operations according to one embodiment.

FIG. 4 is a flowchart of operations 120 according to one embodiment. Operation 121 includes providing network access to a computing device. Operation 122 includes establishing a default rule to change the network access to the computing device in response to a first time of day. Operation 123 includes establishing a conditional rule that the network access to the computing device will remain unchanged after the first time of day in response to a condition that a network session that is ongoing via the network access at the first time of day will reach completion before the second time of day. Operation 124 includes obtaining network session progress data for the ongoing network session of the computing device. Operation 125 includes continue providing the network access to the computing device until the network session has reached completion in response to determining that the ongoing network session can reach completion before expiration of the second time of day. Operation 126 includes changing the network access to the computing device before the network session reaches completion in response to determining that the ongoing network session will not reach completion before expiration of the second time of day.

Figure 5:
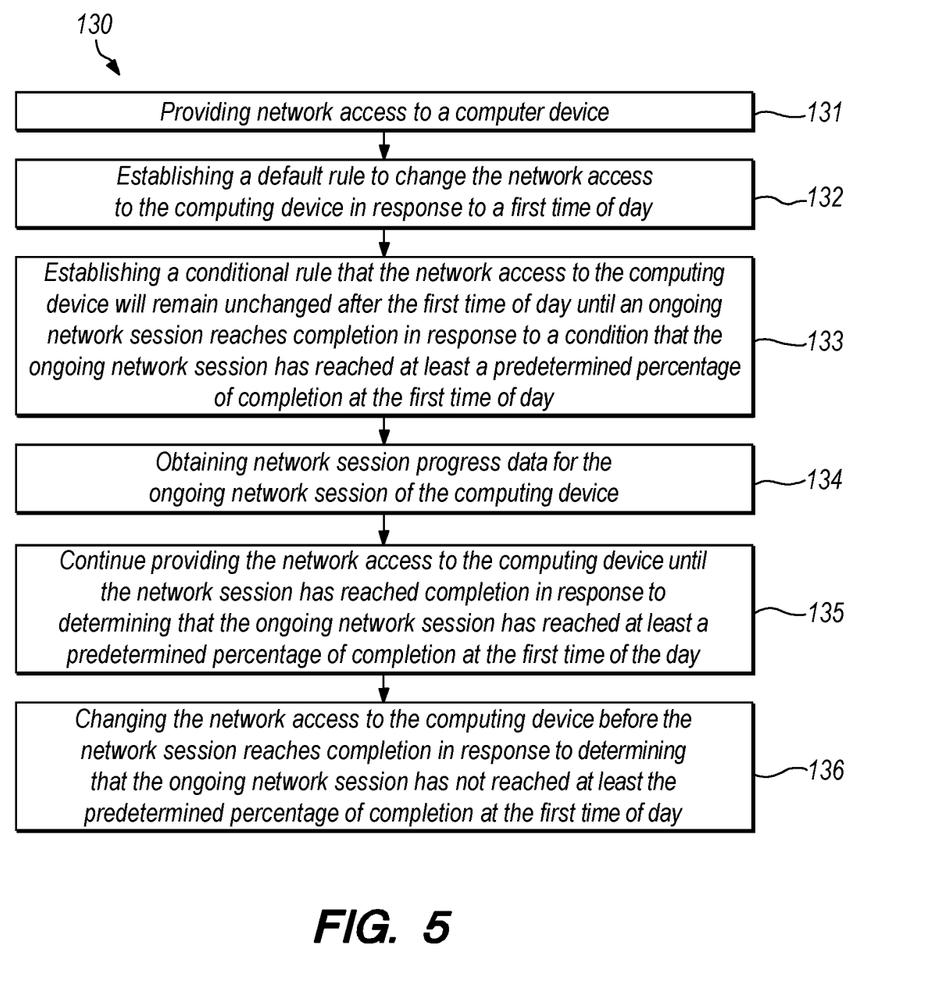
FIG. 5 is a flowchart of operations according to another embodiment.

FIG. 5 is a flowchart of operations 130 according to one embodiment. Operation 131 includes providing network access to a computing device. Operation 132 includes establishing a default rule to change the network access to the computing device in response to a first time of day. Operation 133 includes establishing a conditional rule that the network access to the computing device will remain unchanged after the first time of day until an ongoing network session reaches completion in response to a condition that the ongoing network session has reached at least a predetermined percentage of completion at the first time of day. Operation 134 includes obtaining network session progress data for the ongoing network session of the computing device. Operation 135 includes continue providing the network access to the computing device until the network session has reached completion in response to determining that the ongoing network session has reached at least a predetermined percentage of completion at the first time of day. Operation 136 includes changing the network access to the computing device before the network session reaches completion in response to determining that the ongoing network session has not reached at least the predetermined percentage of completion at the first time of day.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices, such as a router or firewall, to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
    establishing a default rule to change network access to a computing device in response to a first time of day;
    establishing a conditional rule that network access to the computing device will remain unchanged after the first time of day until a second time of day in response to a condition that a network session that is ongoing via network access at the first time of day will reach completion before the second time of day;
    obtaining network session progress data for an ongoing network session of the computing device;
    continue providing the network access to the computing device until the ongoing network session has reached completion in response to determining that the ongoing network session can reach completion before the second time of day; and
    changing the network access to the computing device before the ongoing network session reaches completion in response to determining that the ongoing network session will not reach completion before the second time of day.

2. The computer program product of claim 1, the operations further comprising:
changing the network access to the computing device in response to determining that the ongoing network session has been completed after the first time of day but before the second time of day.

3. The computer program product of claim 1, wherein the operation of changing the network access to the computing device includes gradually degrading a network data transmission rate and/or terminating the network access.

4. The computer program product of claim 1, the operations further comprising:
issuing a message to a user interface describing the change to the network access.

5. The computer program product of claim 1, wherein the processor is a component of a network router and wherein the computing device is a desktop computer, notebook computer, tablet computer, smartphone, television, and/or a video game console.

6. The computer program product of claim 1, the operations further comprising:
identifying an individual user of the computing device by user credentials that are used to log in to the computing device, wherein a value of the first time of day and a value of the second time of day are associated with the identified individual user, and wherein the default rule and the conditional rule are applied to the computing device using the value of the first time of day and the value of the second time of day that are associated with the individual user.

7. The computer program product of claim 1, the operations further comprising:
storing network settings for a plurality of individual users, wherein the network settings include a value of the first time of day and a value of the second time of day.

8. The computer program product of claim 1, wherein the ongoing network session includes a file download, an online video game, and/or a video stream.

9. The computer program product of claim 1, wherein the session progress data for the ongoing network session of the computing device is obtained from a packet header received as part of the ongoing network session.

10. The computer program product of claim 1, wherein the session progress data for the ongoing network session of the computing device is obtained using an application programming interface with a network device.

11. The computer program product of claim 1, wherein the session progress data for the ongoing network session of the computing device is obtained as user input received through a user interface.

12. The computer program product of claim 11, wherein the operations further comprise:
prompting a user to input the session progress data in response to approaching and/or reaching the first time of day.

13. The computer program product of claim 1, the operations further comprising:
receiving and storing a value of the first time of day and a value of the second time of day for each of a plurality of users.

14. The computer program product of claim 13, the operations further comprising:
generating a network settings interface in the form of a webpage displayable on a browser application, wherein the value of the first time of day and the value of the second time of day for each of a plurality of users are received through input from an administrative user interacting with the network setting interface.

15. The computer program product of claim 1, the operations further comprising:
denying network access for a new network session that is attempted to be initiated by the computing device between the first time of day and the second time of day.

16. A computer program product comprising a non-volatile computer readable medium and non-transitory program instructions embodied therein, the program instructions being configured to be executable by a processor to cause the processor to perform operations comprising:
establishing a default rule to change network access to a computing device in response to a first time of day;
establishing a conditional rule that network access to the computing device will remain unchanged after the first time of day until a second time of day in response to a condition that a network session that is ongoing via network access at the first time of day will reach completion before the second time of day;
obtaining network session progress data for an ongoing network session of the computing device;
continue providing the network access to the computing device until the ongoing network session has reached completion in response to determining that the ongoing network session can reach completion before the second time of day; and
changing the network access to the computing device before the ongoing network session reaches completion in response to determining that the ongoing network session will not reach completion before the second time of day.

17. The computer program product of claim 16, wherein the network session progress data for the ongoing network session of the computing device is obtained from a packet header received as part of the ongoing network session.

18. The computer program product of claim 17, where the session progress data within the packet header is a percentage of completion.

19. A network device, comprising:
at least one non-volatile storage device storing program instructions; and
at least one processor configured to process the program instructions,
wherein the program instructions are configured to, when processed by the at least one processor, cause the network device to perform operations comprising:
establishing a default rule to change network access to a computing device in response to a first time of day;
establishing a conditional rule that network access to the computing device will remain unchanged after the first time of day until a second time of day in response to a condition that a network session that is ongoing via network access at the first time of day will reach completion before the second time of day;
obtaining network session progress data for an ongoing network session of the computing device;
continue providing the network access to the computing device until the ongoing network session has reached completion in response to determining that the ongoing network session can reach completion before the second time of day; and
changing the network access to the computing device before the ongoing network session reaches completion in response to determining that the ongoing network session will not reach completion before the second time of day.

20. The network router of claim 19, the operations further comprising:
   identifying an individual user of the computing device by user credentials that are used to log in to the computing device, wherein a value of the first time of day and a value of the second time of day are associated with the identified individual user, and wherein the default rule and the conditional rule are applied to the computing device using the value of the first time of day and the value of the second time of day that are associated with the individual user.

* * * * *